United States Patent
Kaarela et al.

(10) Patent No.: US 7,908,292 B2
(45) Date of Patent: Mar. 15, 2011

(54) METADATA BROKER

(75) Inventors: Kari Kaarela, Oulu (FI); Kirmo Koistinen, Oulu (FI); Timo P. Tervo, Oulu (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 11/567,065

(22) Filed: Dec. 5, 2006

(65) Prior Publication Data
US 2008/0133539 A1 Jun. 5, 2008

(51) Int. Cl.
*G06F 17/30* (2006.01)
(52) U.S. Cl. .......................... 707/783; 705/76; 455/411
(58) Field of Classification Search .............. 707/9, 10, 707/200, 100, 102, 687, 694, 705, 736, 747, 707/781, 783, 764, 790; 455/411, 412.1, 455/410; 705/1, 64, 67, 44, 72, 51–56, 75–79; 380/270
See application file for complete search history.

(56) References Cited

U.S. PATENT DOCUMENTS

| | | | |
|---|---|---|---|
| 7,263,551 B2 * | 8/2007 | Belfiore et al. ............... 709/219 |
| 2002/0143641 A1 * | 10/2002 | Thomas et al. ................. 705/26 |
| 2003/0044015 A1 * | 3/2003 | Cato et al. ..................... 380/270 |
| 2003/0172090 A1 | 9/2003 | Asunmaa |
| 2004/0088174 A1 * | 5/2004 | Agrawal et al. ................... 705/1 |
| 2004/0260701 A1 * | 12/2004 | Lehikoinen et al. ............ 707/10 |
| 2005/0050099 A1 * | 3/2005 | Bleistein et al. ........... 707/104.1 |
| 2005/0071674 A1 * | 3/2005 | Chou et al. .................... 713/201 |
| 2005/0091157 A1 * | 4/2005 | Suzuki et al. .................. 705/40 |
| 2005/0149731 A1 | 7/2005 | Leppanen |
| 2005/0240760 A1 * | 10/2005 | Zhang ........................... 713/157 |
| 2007/0083522 A1 * | 4/2007 | Nord et al. ...................... 707/10 |

FOREIGN PATENT DOCUMENTS

| | | |
|---|---|---|
| WO | 03/030571 A | 4/2003 |
| WO | 2006/011900 A2 | 2/2006 |

OTHER PUBLICATIONS

International Search Report for PCT/IB 2007/003552, dated Apr. 10, 2008, pp. 1-2.

* cited by examiner

*Primary Examiner* — Greta L Robinson
(74) *Attorney, Agent, or Firm* — Ditthavong Mori & Steiner, P.C.

(57) ABSTRACT

The present invention provides methods and apparatuses for obtaining selected metadata from a user device. The user device has a metadata engine that stores and accesses metadata in response to a metadata query. A metadata broker verifies the authenticity of the metadata query from a service provider and returns selected metadata if the service provider has rights to obtain the metadata. The user device has a communications interface that sends a service request that is indicative of the selected service over a communications channel and receives the metadata request that is indicative of the selected metadata. An authorization center receives a metadata request from a service provider, accesses a rule set to determine selected metadata in accordance with predetermined rights, and returns a signed metadata request to the service provider. The signed metadata request has an electronic signature of an authorizing party and is indicative of the selected metadata.

34 Claims, 4 Drawing Sheets

METADATA BROKER

FIELD OF THE INVENTION

The present invention relates to obtaining metadata from a user device. The user device may comprise a mobile terminal such as a mobile phone.

BACKGROUND OF THE INVENTION

Mobile phones are ubiquitous, offering personal services to users. New features provided by mobile phones enable the user to perform a variety of tasks or actions by service businesses providing services to the user. Examples of tasks and actions include surfing the Web, making payments, downloading media and applications, and accessing content for entertainment.

As a mobile phone becomes more versatile, the mobile phone is migrating to a multimedia computer. Consequently, there is a need to collect metadata that is related to tasks and actions corresponding to services provided by service providers. With the increased usage of these services, related metadata is an increasingly valuable asset to businesses offering these services. Thus, there is a real market need to facilitate accessing related metadata from mobile phones.

BRIEF SUMMARY OF THE INVENTION

An aspect of the present invention provides methods and apparatuses for obtaining selected metadata from a user device such as a mobile phone.

With an aspect of the invention, a user device has a metadata engine that stores and accesses metadata in response to a metadata query. A metadata broker verifies the authenticity of the metadata query from a service provider and returns selected metadata if the service provider has rights to obtain the metadata. The user device may use a public key certificate to verify a signed metadata query.

With another aspect of the invention, a user device has a communications interface through which a service request that is indicative of the selected service is sent over a communications channel and a metadata request that is indicative of the selected metadata is received.

With another aspect of the invention, an authorization center receives a metadata request from a service provider, accesses a rule set to determine selected metadata in accordance with predetermined rights, and returns a signed metadata request to the service provider. The signed metadata request, which is indicative of the selected metadata, has an electronic signature of an authorizing party.

With another aspect of the invention, a rule set is edited at an authorization center to reflect revised rights of a service provider for obtaining selected metadata.

With another aspect of the invention, user information is included in a service request. The user information may be contained in a cookie. The user information is verified by a service provider and is used to create a metadata request.

BRIEF DESCRIPTION OF THE DRAWINGS

A more complete understanding of the present invention may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

The following is separated by subheadings for the benefit of the reader. The subheadings include: Terms, Architecture of Platform, Exemplary Message Scenario, Process for Querying Metadata, and Apparatus for a User Device.

Terms

Metadata—data related to objects/files that are handled by a user device for providing services (e.g., contacts, media accesses, calls, messages). Metadata is typically data about the data, e.g., name, size, date of the file creation, album, artist, genre of the music track, and so forth.

Service Provider (xSP)—umbrella term for different types of service providers, including internet service providers (ISP), application service providers (ASP), and storage service providers (SSP).

certificate—encrypted data file that includes the name and other data to identify the transmitting entity, The certificate may contain the public key that serves to verify the digital signature of the sender who signed with a matching private key.

certificate authority (CA)—a trusted third party that issues digital certificates used to create digital signatures and public-private key pairs. These key pairs allow all system users to verify the legitimacy of all the system users with assigned certificates. The role of the CA is to insure that the individual granted the unique certificate is who he or she claims to be.

Architecture of Platform

Figure 1:
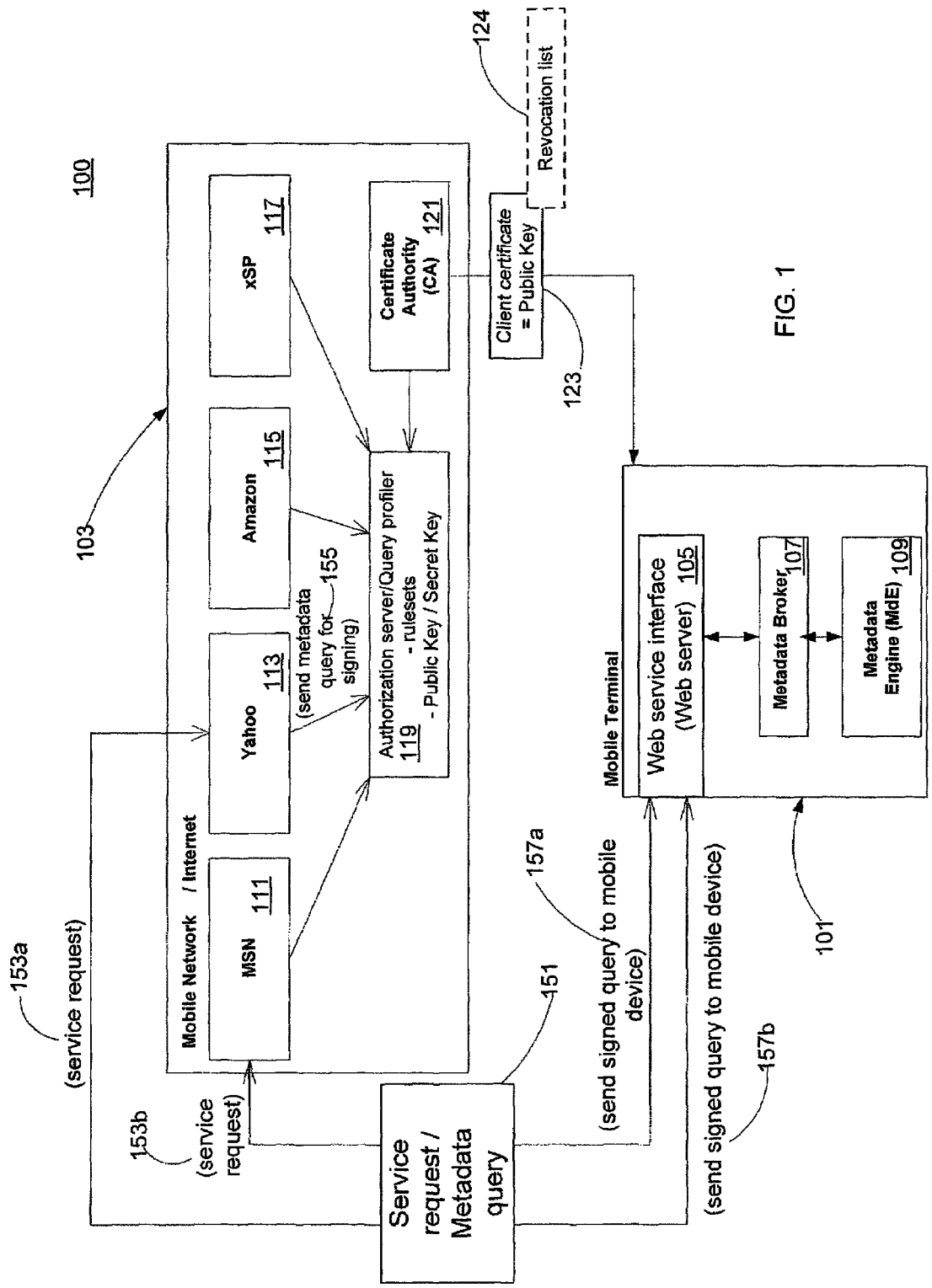
FIG. 1 shows a system architecture for obtaining metadata from a user device in accordance with an embodiment of the invention.

FIG. 1, describing one embodiment of the invention, shows system architecture 100 for obtaining metadata from a user device (e.g., mobile terminal 101) in accordance with an embodiment of the invention. Embodiments of the invention support user devices including wireless devices, including mobile telephones, mobile communication devices, laptop computers, wireless audio and/or video devices, digital cameras, digital video cameras, web pads, location determining devices (e.g. GSP devices), watches, or any combination of the aforementioned. Also, embodiments of the invention support wire-tethered and cable-tethered devices, such as personal computers, televisions, set-top boxes, digital video recorders, personal video recorders, or any combination of the aforementioned.

Mobile terminal 101 is often the most personal device that users carry with them almost all the time. New features of mobile terminal 101 enable the user to perform a variety of tasks or actions (as provided by services offered by service provides 111-117) with mobile terminal 101. Examples of such tasks or actions (services) include surfing the web, making payments, downloading applications and media, and accessing media entertainment.

With an embodiment of the invention, mobile terminal 101 may function as a multimedia computer that may collect all kinds of files that include metadata describing features of the files, and all kind of metadata related to user tasks and actions related to the stored files, SW applications or actions in general. The collected metadata from a plurality of mobile terminals may reflect the collective preferences of the mobile terminal users. This knowledge can be an invaluable asset to service providers (xSPs).

Service providers 111-117 understand the importance and value of the metadata that mobile terminal 101 collects and stores. Different businesses are interested in the user preferences and behavior that mobile terminal records and stores for the user. Consequently, different service providers may be interested in different metadata. Embodiments of the invention enable a service provider to access the metadata that is relevant to a selected service by supporting a "personalized" view to the mobile terminal's metadata to each service provider that we make an agreement with.

Architecture 100 is flexible to enable configuration of new service providers with their specific metadata needs and scalable enough to scale up to serve thousands (or more) service providers.

Mobile terminal 101 interacts with network 103 in order to obtain services. With an embodiment of the invention, mobile terminal communicates with a service provider, which is associated with network 103. For example, mobile terminal 101 may send service request 153a to request a first service from service provider 113. Embodiments of the invention support different communications channels over different communications media including wireless radio channels, cable, and digital subscriber lines (DSL).

In order for service provider 113 to provide the selected service to mobile terminal 101, service provider 113 may require access to selected metadata from mobile terminal 101. Service provider 113 consequently transmits signed query message 157a to query mobile terminal 101 for selected metadata that is related to the requested service. Authorization center 119 knows service provider 113 and the associated rules (rule set) for accessing metadata from mobile terminal 101. Accordingly, authorization center 119 signs signed metadata query request 157a using a secret key of the certificate (e.g., certificate 201) from certificate authority 121. If mobile terminal 101 accepts query message 157a, mobile terminal 101 provides the selected metadata to service provider 113. In return, the mobile terminal 101 may provide the selected metadata in a secure manner so that only the service provider 113 that sent the relevant metadata request 157a is capable to open it. The secure manner may be for example a HTTPS connection. By using the HTTPS connection also the service request 153a may be sent in a secure manner to the service provider. Service provider 113 consequently provides the selected service. Exemplary message scenarios will be discussed with FIG. 2.

Mobile terminal 101 may also request a second service from another service provider 111 by sending service request 153b. Service provider 111 consequently transmits signed query message 157b to query mobile terminal 101 for associated metadata that is related to the requested second service. The associated metadata may be different from the metadata associated with the first requested service.

Mobile terminal 101 may store both private and public metadata. The user controls who accesses private metadata. The user may grant access to specific metadata when joining a service and agreeing to its terms. Some of the metadata may be abstracted to reflect public metadata that cannot be associated to a particular person afterwards. In such cases, the metadata becomes valuable when aggregated with similar metadata of millions of other users. Mobile terminal 101 may filter metadata by removing private metadata when providing metadata to a service provider.

Embodiments of the invention may address network congestion. For example, when collecting metadata, several xSPs may actively poll user metadata from millions of mobile terminals or millions of phones actively push their metadata to several xSPs. As will be discussed, embodiments of the invention provide direct metadata transfer to xSPs.

Metadata engine (MdE) 109 is capable of storing and accessing any metadata in mobile terminal 101. The metadata engine 109 provides application providers with versatile metadata APIs. Moreover, metadata engine 109 is designed and built to benefit internal applications of mobile terminal 101 even though it is possible to import/export metadata to/from metadata engine 109. Metadata engine 109 also provides configurable, extensible, and scalable access to the metadata for external parties, e.g., xSPs 111-117.

The invention also supports configuration capabilities, in which each xSP only has access to that metadata that is specified for the xSP in the authorization server/query profiler 119.

Some embodiments of this invention are the following:
configurability: dynamic metadata rule set update in the authorization server/query profiler 119 without need for configuration within xSP 111-117 or mobile terminal 101
security: secure queries to mobile terminals by signed certificates granted by certificate authority 121; only the authorized xSPs are entitled to access the metadata they are entitled to
efficiency: saves network bandwidth, direct metadata transfer to xSPs 111-117 without any need for authorization and minimal additional network loading Some embodiments of the invention support different kinds of xSP services that either create, update, or access the metadata in the mobile terminals. The implementation of the invention includes the following components (see FIG. 1):
Mobile terminal 101:
Web server 105
Web service interface 105 that may support Web2.0 technologies
metadata engine 109
metadata broker 107
Certificate Authority (CA) 121
Authorization server/Query profiler (Authentication center) 119
xSP 111-117
Each of these components is described below in more detail.

Mobile Phone

Metadata engine (MdE) 109 comprises a database for storing and accessing metadata that can be related to any objects/files that are handled in the mobile terminal (e.g. contacts, media, calls, and messages).

Mobile terminal 101 also includes Web service interface (WS) 105 through which xSPs 111-119 can make metadata queries/updates to mobile terminals. Metadata broker 107 acts as a bridge between WS interface 105 and metadata engine 109, thus enabling the remote metadata queries by the xSPs 111-119.

Figure 2:
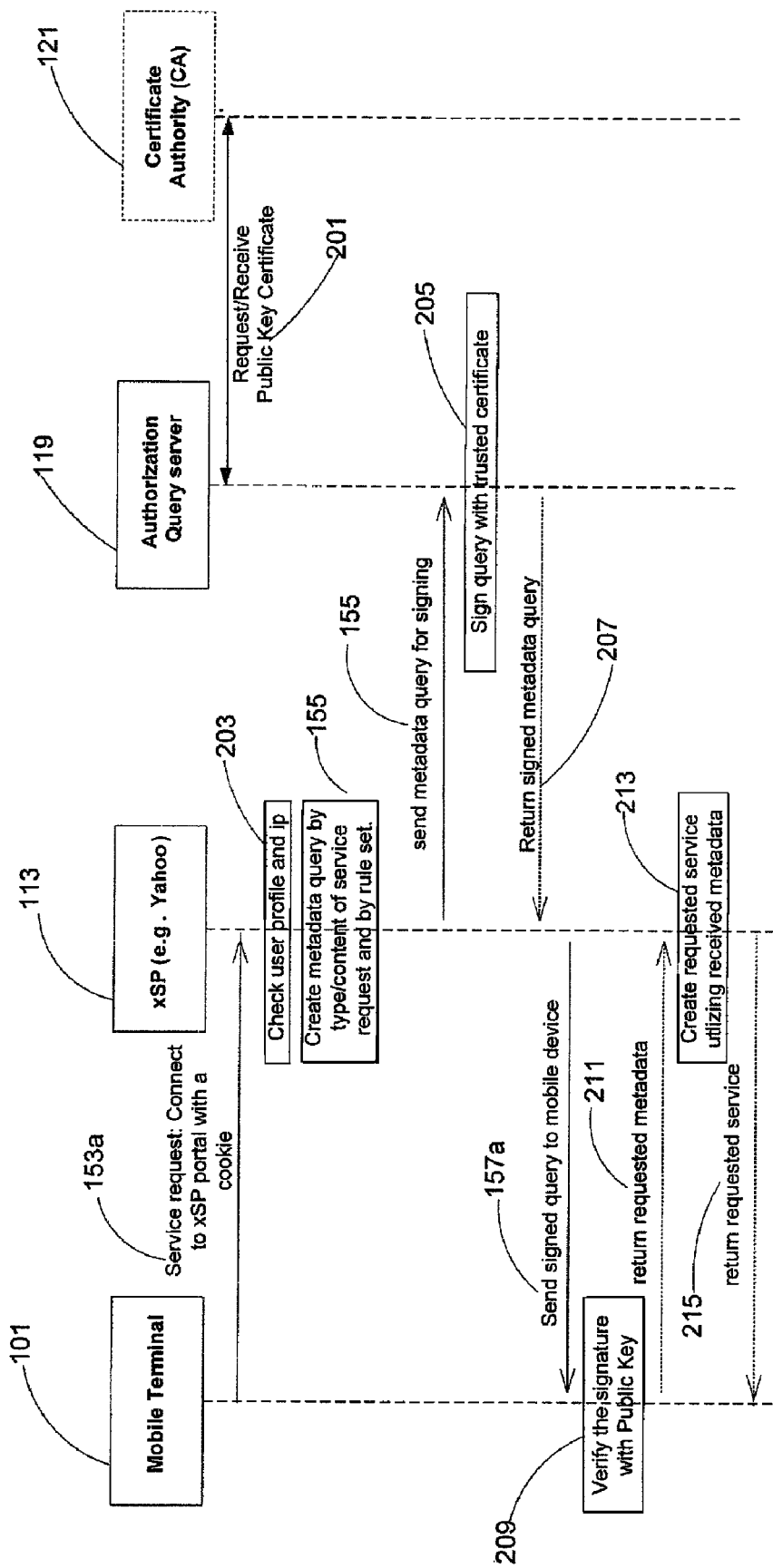
FIG. 2 shows a messaging scenario between components of a network supporting a service to a user device in accordance with an embodiment of the invention.

All the metadata queries are signed by the Authorization server/Query profiler 119 with a certificate (public key and secret key) 201 (as shown in FIG. 2) that has been granted and delivered by certificate authority 121. With an embodiment of the invention, mobile terminal 101 has a public key certificate 123 (created by certificate authority 121) to open/process signed metadata query 157a,157b. Public key certificates are usually factory-installed, but public key certificates can also be e.g. downloaded from the web. However, this approach may compromise security. Mobile terminal 101 may act as a web server that provides WS interface 105.

Certificate Authority (CA)

Certificate authority (CA) 121 issues a public key certificate (e.g., as certificate 201 as shown in FIG. 2) stating that the CA attests that the public key contained in the certificate belongs to the authorization server owner (xSP 113) noted in the certificate. An obligation of certificate authority 121 is to verify an applicant's credentials, so that mobile terminal 101 can trust the information in the CA's certificates. If mobile terminal 101 trusts the CA 121 and can verify the CA's signature, then mobile terminal 101 can verify that the public key belongs to whomever is identified in the certificate.

A public key certificate (or identity certificate) is a certificate that uses a digital signature to bind together a public key with an identity, including information such as the name of a person or an organization and the associated address. A public key certificate typically includes:

The public key being signed

A name, which can refer to a person, a computer or an organization

A validity period

The location (URL) of a revocation center

The digital signature of the certificate, produced by the CA's private key

A certificate may be revoked if it is discovered that its related private key has been compromised, or if the relationship (between an entity and a public key) embedded in the certificate is discovered to be incorrect or has changed; this might occur, for example, if a person changes jobs or names. A revocation will likely be a rare occurrence, but the possibility means that when a certificate is trusted, the user should always check its validity. This can be done by comparing it against a certificate revocation list 124, which is a list of revoked or cancelled certificates. Ensuring that such a list is up-to-date and accurate is a core function in a centralized PKI, one which requires both staff and budget and one which is therefore sometimes not properly done. To be effective, it must be readily available to any who needs it whenever it is needed and must be updated frequently. The other way to check certificate validity is to query the certificate authority using the Online Certificate Status Protocol (OCSP) to know the status of a specific certificate.

Authentication Center

The main role of the Authentication Center (Authorization server/Query profiler) 119 is to verify that metadata queries are made by xSPs 111-119 and sent to the Authorization server/Query profiler 119 for an authorization match using the rule set that has been agreed with the Authorization server/Query and the xSP. A rule set specifies the xSPs access rights to the metadata, i.e., what specific metadata the xSP is entitled to access. For example, if the service request is for a music service, the related metadata may be genres used/downloaded in last year.

Certificate (public key and secret key) 201 (as shown in FIG. 2) is typically transferred from certificate authority 121 and stored in Authorization server/Query profiler 119.

The rule sets are stored in Authorization server/Query profiler 119 as well as in xSPs so that the xSPs can create metadata queries before sending them for authorization. A rule set is typically a collection of rules, in which rule set parameters are inputted into a rule set, resulting in an indication of the accessible metadata that can be obtained in accordance with the rights of the service provider.

After the query has been verified (as above), the Authorization server/Query profiler 119 signs the metadata query so that signed metadata query 157a,157b cannot be modified by any party before it is delivered to mobile terminal 101.

Authorization server 119 provides a Web service interface for xSPs 111-117 to send metadata queries to be verified and signed. Connection between an xSP and Authorization server/Query profiler 119 is typically protected by using https (TLS).

The signed metadata query is sent from the Authorization server/Query 119 back to an xSP. The xSP then sends the signed metadata query 157a,157b to mobile terminal 101. However, the xSP cannot change/modify the signed metadata query.

Authorization server/Query profiler 119 contains functionality to add, edit and remove xSP-specific rule sets that specify access rights to the metadata. Authorization server/Query profiler 119 also contains a database for storing and managing these entries. Rule sets are created and agreed with between the xSPs 111-117 and Authorization server/Query profiler 119.

Service Provider (xSP)

With embodiments of the invention, an xSP deploys services that utilize either the public or private metadata that is stored in mobile terminal 101. An xSP implements the client-side of the WS interface so that Authorization server/Query profiler 119 can verify and sign metadata queries. An xSP also supports the client-side of the WS interface to access metadata stored in mobile terminal 101.

Exemplary Message Scenario

FIG. 2, describing one embodiment of the invention, shows a messaging scenario between components of a network supporting a service to a mobile device in accordance with an embodiment of the invention. Mobile terminal 101 sends service request 153a over a communications channel to service provider 113. Service request 153a is processed by service provider 113 to verify consistency with a user profile 203. Metadata query 115 is created by service provider 113 in accordance with the type and content of service request 153a and a rule set. Service request 153a may include user information. With an embodiment of the invention, user information is contained in a cookie. The cookie in the service request 153a may include information on device type and/or user identification parameters. User information, e.g., missing device type or user identification, may be requested in the metadata query 155. Metadata query 155 includes at least one at least one rule set parameter, which is indicative of a predetermined right of the service provider.

Authorization center 119 processes metadata query 155 by utilizing a rule set that should be consistent with the rule set that is utilized by service provider 113. If service provider 113 has rights to access selected metadata, authorization center 119 returns signed metadata query 207 with certificate 205 to service provider 113. In order to sign signed metadata query 207, authorization center 119 obtains public key certificate 201 from certificate authority 121.

Service provider 113 subsequently sends signed metadata query 157a over the communications channel to mobile terminal 101. Mobile terminal 101 verifies signed metadata query 157a using public key 209. If the request is verified, mobile terminal 101 returns selected metadata to service provider 113 by sending requested metadata 211 over the communications channel. Service provider 113 creates the selected service. Service provider 113 may use the returned metadata for creating the selected service. With return requested service 215, service provider 113 provides the selected service (e.g., musical content or personalized web page) to mobile terminal 101.

Process for Querying Metadata

Figure 3:
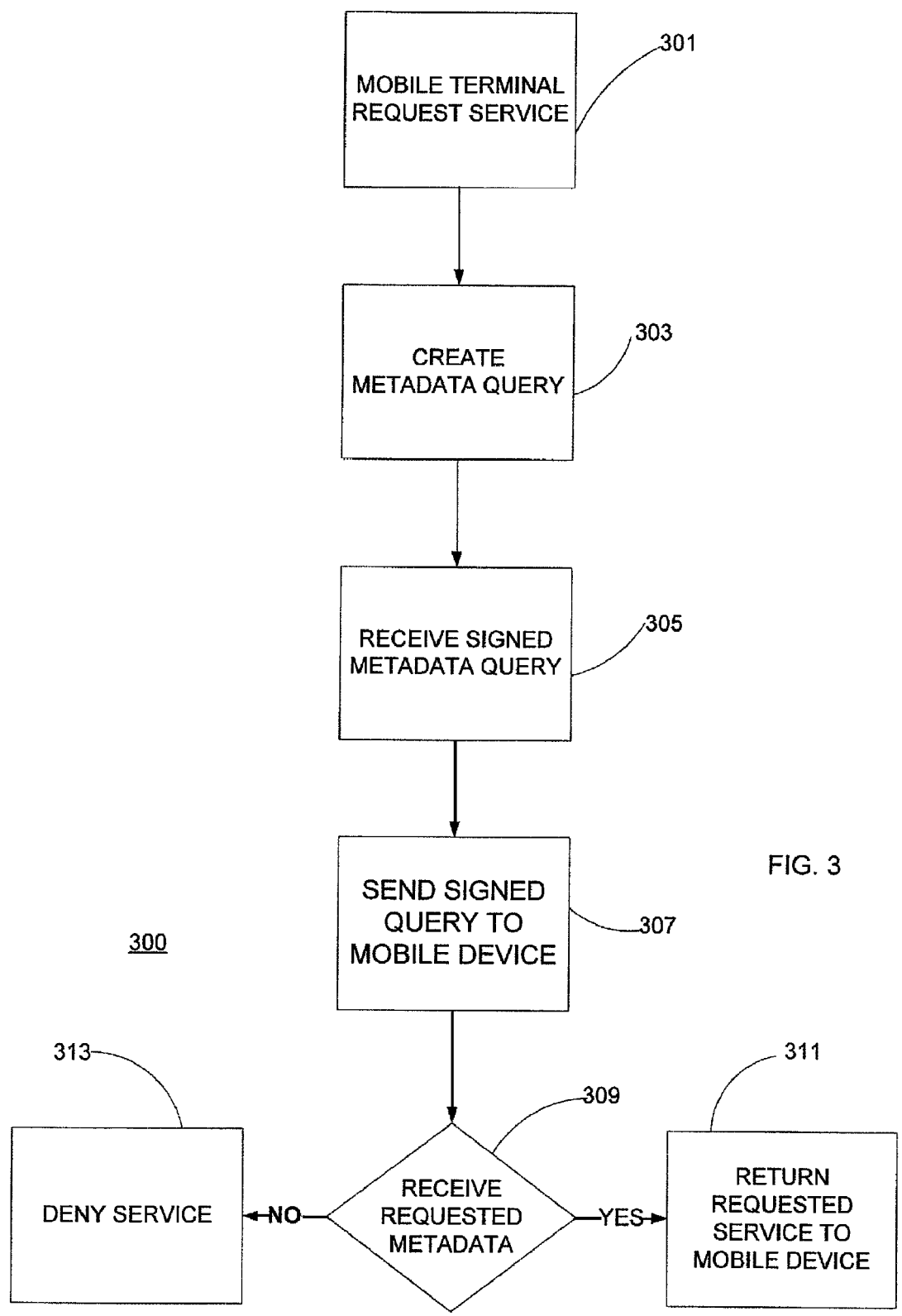
FIG. 3 shows a flow diagram for a service provider that obtains metadata from a user device in accordance with an embodiment of the invention.

FIG. 3, describing one embodiment of the invention, shows flow diagram 200 for a service provider that obtains metadata from a user device (e.g., mobile terminal 101) over a communications channel in accordance with an embodiment of the invention. In step 301, a service provider receives a request for a selected service from mobile terminal 101. Consequently, the service provider creates a metadata query in step 303. If the metadata request is verified by authorization center 119, the service provider receives a signed metadata query in step 305. The service provider sends the signed metadata query to mobile terminal 101 over the communications channel.

Mobile terminal 101 verifies the signed metadata query and returns the selected metadata in steps 309 and 311. If mobile terminal 101 does not return the selected metadata, the service provider may deny the requested service in step 313.

Apparatus for User Device

Figure 4:
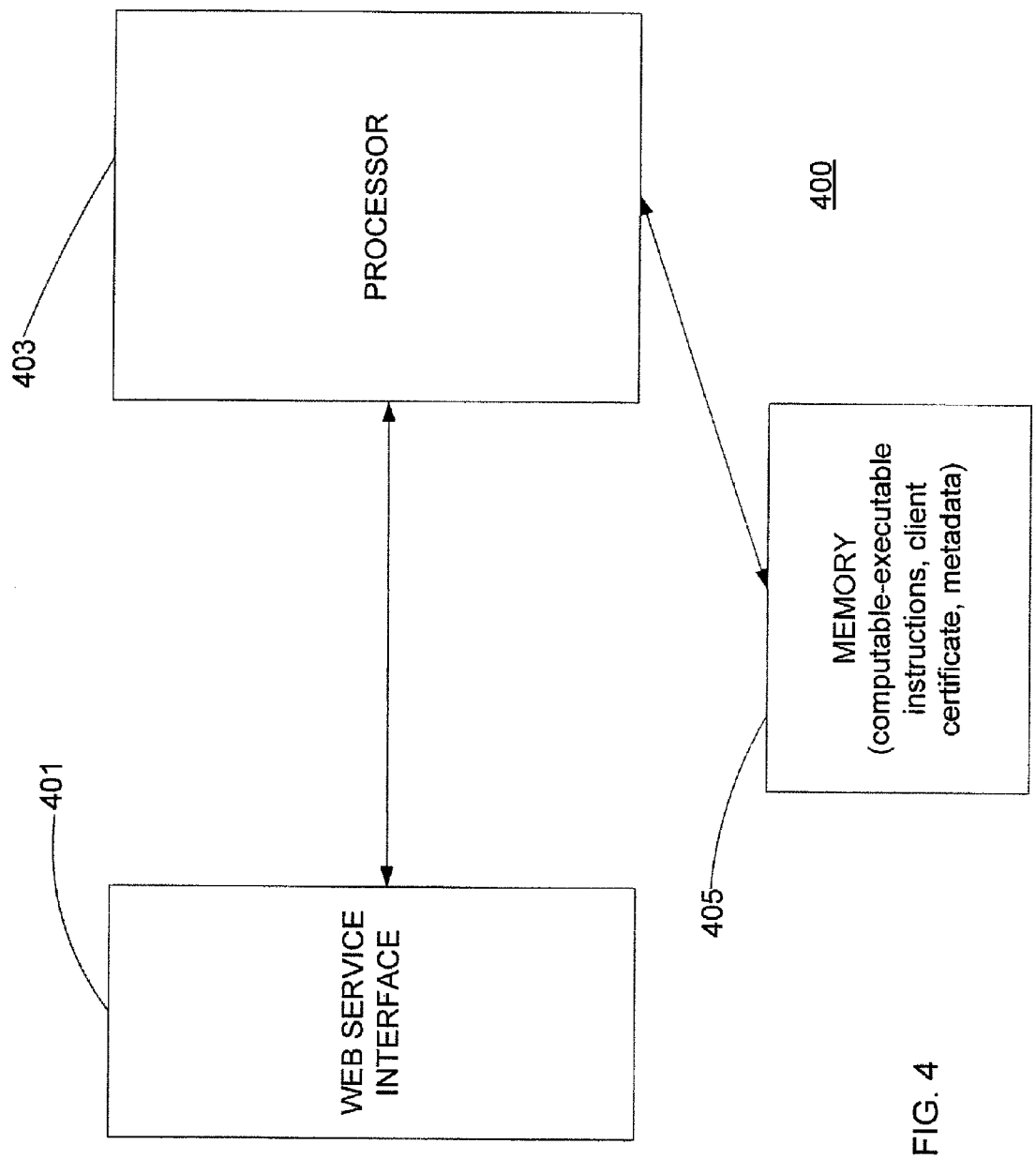
FIG. 4 shows a user device that provides metadata to a service provider in accordance with an embodiment of the invention.

FIG. 4, describing one embodiment of the invention, shows mobile device 400 that provides metadata to a service provider in accordance with an embodiment of the invention. With an embodiment of the invention, processor 403 processes service request 153a received over a communications channels through a communications interface (e.g., Web service interface) 401. Processor 403 may process service request 153a in accordance with flow diagram 300 as shown in FIG. 3. Memory 405 stores computer-executable instructions for executing flow diagram 300, storing metadata, and storing a public key certificate when verifying metadata queries from the service provider.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations, permutations and combinations of the above described systems, techniques and embodiments that fall within the spirit and scope of the invention as set forth in the appended claims.

We claim:

1. A method comprising:
 sending, by a mobile terminal, a service request to a service provider for a selected service;
 receiving in response to the service request, at the mobile terminal, a signed metadata request having an electronic signature of an authorizing party that authenticates the service provider, the authorizing party being independent from the service provider and the mobile terminal, the signed metadata request requesting selected metadata collected by and stored in the mobile terminal and related to tasks or actions that are performed at the mobile terminal and enabled by the selected service;
 verifying, by a metadata broker in the mobile terminal, the electronic signature in the signed metadata request; and
 transmitting directly to the service provider, by the metadata broker, the selected metadata.

2. A method of claim 1, further comprising:
 using a public key certificate to verify the signed metadata request.

3. A method of claim 1, further comprising:
 filtering the selected metadata to remove private metadata.

4. A method of claim 1, further comprising:
 providing user information in the service request, the user information including a device type or a user identification.

5. A method of claim 1, wherein the tasks or actions include at least one of surfing the Internet, making payments, downloading media and applications, and accessing content for entertainment.

6. A method of claim 1, wherein the metadata is related to objects or files that are handled by the mobile terminal for providing user services, and the objects or files include at least one of contacts, calls, and messages of the user.

7. A computer-readable storage medium storing one or more sequences of one or more instructions which, when executed by one or more processors, cause a mobile terminal to at least perform the following steps:
 sending a service request to a service provider for a selected service;
 in response to the service request, receiving a signed metadata request having an electronic signature of an authorizing party that authenticates the service provider, the authorizing party being independent from the service provider and the mobile terminal, the signed metadata request requesting selected metadata collected by and stored in the mobile terminal and related to tasks or actions that are performed at the mobile terminal and enabled by the selected service;
 verifying, by a metadata broker in the mobile terminal, the electronic signature in the signed metadata request; and
 transmitting directly to the service provider, by the metadata broker, the selected metadata.

8. A computer-readable storage medium of claim 7, wherein the mobile terminal is caused to further perform:
 using a public key certificate to verify the metadata request.

9. A computer-readable storage medium of claim 7, wherein the mobile terminal is caused to further perform:
 filtering the selected metadata to remove private metadata.

10. A computer-readable storage medium of claim 7, wherein the mobile terminal is caused to further perform:
 providing user information in a service request, the user information including a device type or a user identification.

11. A computer-readable storage medium of claim 7, wherein the tasks or actions include at least one of surfing the Internet, making payments, downloading media and applications, and accessing content for entertainment.

12. A computer-readable storage medium of claim 7, wherein the metadata is related to objects or files that are handled by the mobile terminal for providing user services, and the objects or files include at least one of contacts, calls, and messages of the user.

13. A mobile terminal comprising:
 at least one processor; and
 at least one memory including computer program code, the at least one memory and the computer program code configured to, with the at least one processor, cause the mobile terminal to perform at least the following,
 send a service request to a service provider for a selected service;
 in response to the service request, receive a signed metadata request having an electronic signature of an authorizing party that authenticates the service provider, the authorizing party being independent from the service provider and the mobile terminal, the signed metadata request requesting selected metadata collected by and stored in the mobile terminal and related to tasks or actions that are performed at the mobile terminal and enabled by the selected service;

verify, by a metadata broker in the mobile terminal, the electronic signature in the signed metadata request; and transmit directly to the service provider, by the metadata broker, the selected metadata.

14. A mobile terminal of claim 13, wherein the mobile terminal is further caused to:
use a public key certificate to verify the signed metadata request.

15. A mobile terminal of claim 13, wherein the mobile terminal is further caused to:
filter the selected metadata to remove private metadata.

16. A mobile terminal of claim 13, wherein the mobile terminal is further caused to:
provide user information in the service request, the user information including a device type or a user identification.

17. A mobile terminal of claim 13, wherein the selected metadata is dependent on the selected service.

18. A mobile terminal of claim 13, wherein the selected metadata is returned only when the electronic signature is verified.

19. A mobile terminal of claim 13, wherein the tasks or actions include at least one of surfing the Internet, making payments, downloading media and applications, and accessing content for entertainment.

20. A mobile terminal of claim 13, wherein the metadata is related to objects or files that are handled by the mobile terminal for providing user services, and the objects or files include at least one of contacts, calls, and messages of the user.

21. A method comprising:
causing, at least in part, transmission of a service request from a mobile terminal to a service provider for a selected service;
in response to the service request, causing, at least in part, reception at the mobile terminal a signed metadata request having an electronic signature of an authorizing party that authenticates the service provider, the authorizing party being independent from the service provider and the mobile terminal, the signed metadata request requesting selected metadata collected by and stored in the mobile terminal and related to tasks or actions that are performed at the mobile terminal and enabled by the selected service;
causing, at least in part, verification by a metadata broker in the mobile terminal the electronic signature in the signed metadata request; and
causing, at least in part, transmission of the selected metadata directly from the metadata broker to the service provider.

22. A method of claim 21, further comprising:
using a public key certificate to verify the signed metadata request.

23. A method of claim 21, further comprising:
filtering the selected metadata to remove private metadata.

24. A method of claim 21, further comprising:
providing user information in the service request, the user information including a device type or a user identification.

25. A computer-readable storage medium storing one or more sequences of one or more instructions which cause an apparatus within a mobile terminal to at least perform the following steps:
causing, at least in part, transmission of a service request to a service provider for a selected service;
in response to the service request, causing, at least in part, reception a signed metadata request having an electronic signature of an authorizing party that authenticates the service provider, the authorizing party being independent from the service provider and the apparatus, the signed metadata request requesting selected metadata collected by and stored in the apparatus and related to tasks or actions that are performed at the apparatus and enabled by the selected service;
causing, at least in part, verification by a metadata broker in the apparatus the electronic signature in the signed metadata request; and
causing, at least in part, transmission of the selected metadata directly from the metadata broker to the service provider.

26. A computer-readable storage medium of claim 25, wherein the apparatus is caused to further perform:
using a public key certificate to verify the metadata request.

27. A computer-readable storage medium of claim 25, wherein the apparatus is caused to further perform:
filtering the selected metadata to remove private metadata.

28. A computer-readable storage medium of claim 25, wherein the apparatus is caused to further perform:
providing user information in a service request, the user information including a device type or a user identification.

29. An apparatus comprising:
at least one memory including computer program code, the at least one memory and the computer program code configured to cause the apparatus within a mobile terminal to perform at least the following,
cause, at least in part, transmission of a service request to a service provider for a selected service;
in response to the service request, cause, at least in part, reception a signed metadata request having an electronic signature of an authorizing party that authenticates the service provider, the authorizing party being independent from the service provider and the apparatus, the signed metadata request requesting selected metadata collected by and stored in the apparatus and related to tasks or actions that are performed at the apparatus and enabled by the selected service;
cause, at least in part, verification by a metadata broker in the apparatus the electronic signature in the signed metadata request; and
cause, at least in part, transmission of the selected metadata directly from the metadata broker to the service provider.

30. An apparatus of claim 29, wherein the apparatus is further caused to:
use a public key certificate to verify the signed metadata request.

31. An apparatus of claim 29, wherein the apparatus is further caused to:
filter the selected metadata to remove private metadata.

32. An apparatus of claim 29, wherein the apparatus is further caused to:
provide user information in the service request, the user information including a device type or a user identification.

33. An apparatus of claim 29, wherein the selected metadata is dependent on the selected service.

34. An apparatus of claim 29, wherein the selected metadata is returned only when the electronic signature is verified.

* * * * *